Oct. 15, 1929.   C. R. SODERBERG   1,731,357
BALANCING MACHINE
Filed Dec. 21, 1922

WITNESSES:
A. L. Jeffry
W. B. Jaspert

INVENTOR
Carl Richard Soderberg
BY
Wesley G. Carr
ATTORNEY

Patented Oct. 15, 1929

1,731,357

UNITED STATES PATENT OFFICE

ARL RICHARD SODERBERG, OF EDGEWOOD PARK, PENNSYLVANIA, ASSIGNOR TO WESTINGHOUSE ELECTRIC & MANUFACTURING COMPANY, A CORPORATION OF PENNSYLVANIA

BALANCING MACHINE

Application filed December 21, 1922. Serial No. 608,371.

My invention relates to balancing machines, more especially to machines for testing the unbalanced mass in rotors, such as armatures for dynamo-electric machines.

It is among the objects of this invention to provide a device of the above-designated character that shall be adapted to indicate the amount and relative location of unbalanced masses in a body being tested.

It is a further object of this invention to provide a device which shall be mechanically simple and accurate for determining such unbalance and which shall be adapted, in particular, to the testing of rotors in large quantities in an efficient and expeditious manner.

In my copending application, Serial No. 593,732, filed Oct. 11, 1922, I have disclosed a device for testing rotors which is especially adapted to indicate unbalance in small high-speed bodies, as the degree of error in the manipulation of the device is so small as to make possible the detection of relatively small unbalanced mass in the body tested.

The centrifugal forces exerted on the body produce vibration of its movable support which indicates the degree of unbalance in the body tested, and a movable fulcrum upon which the body is supported permits of determining the degree of unbalance about a given transverse axis. This arrangement reduces the number of weights to be applied so that the total amount of correction becomes a minimum.

My present invention is directed to a device for testing rotating bodies for unbalance mass which embodies the movable fulcrum of the above-mentioned device and which further employs an adjustable counterweight by which the amount and the relative location of unbalance are determined. By means of the counterweight, it is possible to introduce an artificial unbalance which counteracts the centrifugal forces produced by the unbalanced masses of the rotating body. When these forces are equivalent and opposed, the vibration of the movable support upon which the rotor is mounted ceases. The counterbalancing weights of the device comprises two angularly movable members, and the resultant of the magnitude of the displaced counteracting forces produced by the weights indicates the longitudinal plane in which the correction weight is to be applied to the rotor. The magnitude of unbalance is a function of the angle between the counterweights and is indicated by suitable graduations on the counterweight supports.

In the accompanying drawing constituting a part hereof and in which like reference characters designate like parts, Figure 1 is a side elevational view of a balancing machine embodying the principles of my invention;

Figure 1:
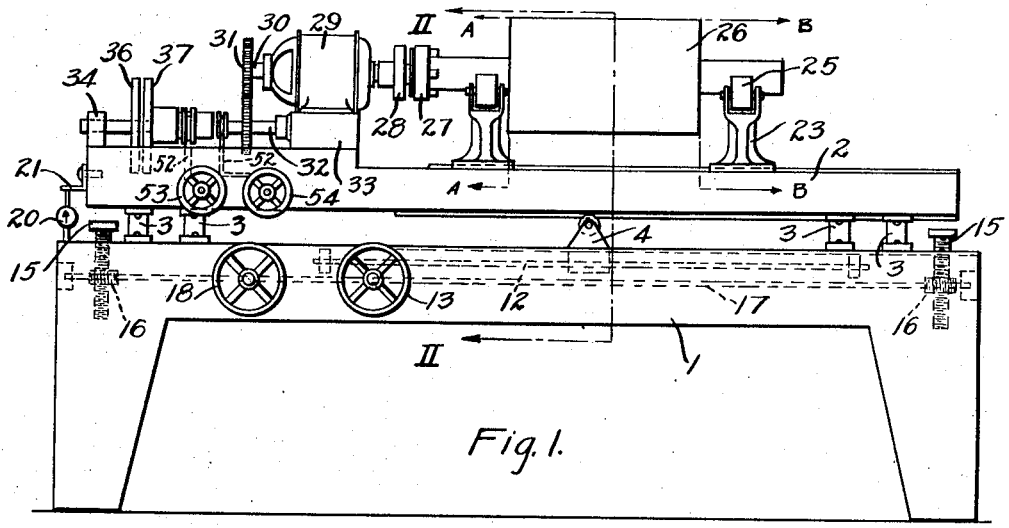

Referring to Fig. 1, the device comprises a stationary support 1, having a vertically movable bed 2, secured thereto by a plurality of transverse spring bars or plates 3. A movable fulcrum 4 is interposed between the bed 2 and the support 1 and comprises a transverse beam 5, provided with projections 6 at the base near its respective ends which are adapted to slide in correspondingly shaped ways 7 of the supports 1. A plurality of grooved rollers 8 are rotatably mounted in the upper portion of the beam 5 and are adapted to engage the knife edges 9, formed integrally with the movable bed 2. The beam 5 is provided with a threaded opening 10, which is adapted to engage a screw 12, geared to a hand wheel 13 by which the fulcrum is actuated longitudinally of the bed and support. A plurality of lifting jacks 15 are connected by a worm gear 16 to a longitudinal rod 17, which is connected to a hand wheel 18. The lifting jacks 15 function to raise the bed 2 out of contact with the fulcrum 4. An indicating device, such as a dial indicator 20, is secured to the support 1 and is adapted to engage a projecting arm 21, secured to the movable bed 2 to indicate the degree of vibration.

Figure 4:
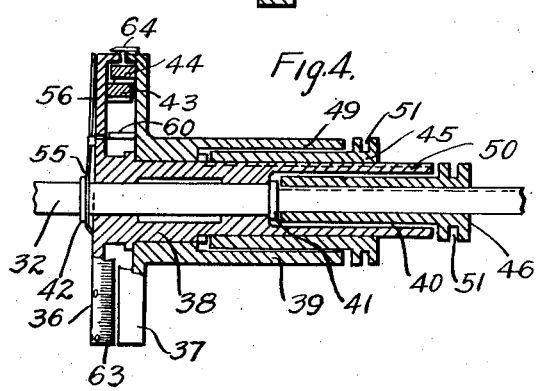
Fig. 4 is a longitudinal sectional view thereof.

The bed 2 is provided with a plurality of roller-bearing supports 23 having rollers 25 rotatably mounted thereon which are adapted to rotatably support a body to be tested, such as a rotor 26. The rotor 26 is secured, by a chuck or clamp 27 which is flexibly connected, through a flexible coupling 28, to a motor 29 which may be regulated to any desired speed. One end of the motor shaft 30 is connected, by a pair of spur gears 31, of a one-to-one ratio, to a shaft 32 journaled on the body 2 by journal brackets 33 and 34. The shaft 32 is provided with a counterbalancing device comprising a plurality of parallel disks 36 and 37, which are formed integral with extension sleeves 38 and 39, respectively (Fig. 4). The sleeve 38 is provided with a counterbore 40, by which it rests against a spacing collar or shoulder 41 of the shaft 32, and the other end of the sleeve 38 is retained on the shaft by a similar collar 42. The disks 36 and 37 are provided with counterweights 43 and 44, respectively. The disks are adapted to be moved angularly by a plurality of adjusting sleeves 45 and 46, respectively, which are loosely keyed on the sleeve 38 and the shaft 32.

The sleeves 45 and 46 are provided with threaded outer portions 49 and 50 to effect a threaded engagement with the sleeves 39 and 38, respectively, and they are further provided with grooves 51 adapted to receive trunnions of shifting levers 52, which are connected, by screw-and-nut mechanism (not shown) to the hand wheels 53 and 54 (Fig. 1). A collar 55, having an indicator 56 attached thereto, is mounted on the shaft 32 against the outer face of the disk 36. The indicator 56 is provided with a movable sleeve 57, which is connected, by links 58 and 59, to the disk 36 and a projecting pin 60 secured to the disk 37, which extends through a slot 61 provided in the disk 36. The links 58 and 59 are pivoted to their respective disks in radial alinement with the counter-weights thereof and maintain a central relation of the indicator 56 with respect to the weights 43 and 44, irrespective of their relative positions. The outer surface 63 of the disk 36 is provided with graduations, and an indicator 64 is secured to the disk 37.

Figure 5:
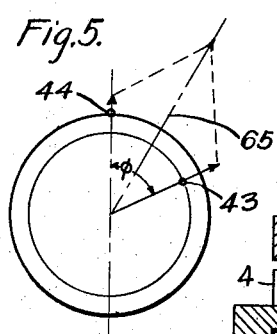
Fig. 5 is a diagrammatic view of the relative positions of the counterbalancing weights, the resultant of which indicates the amplitude of the unbalance mass of the body tested.
Figure 2:
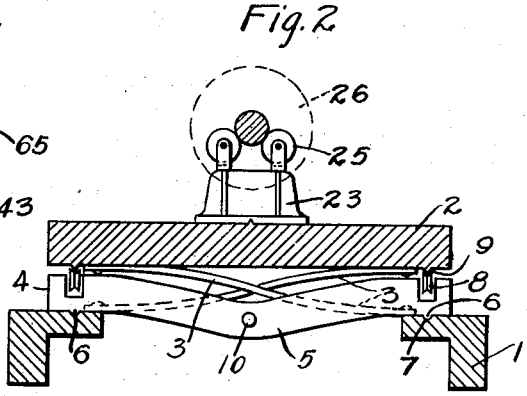
Fig. 2 is a cross-sectional view thereof, taken along the line II—II of Fig. 1.
Figure 3:
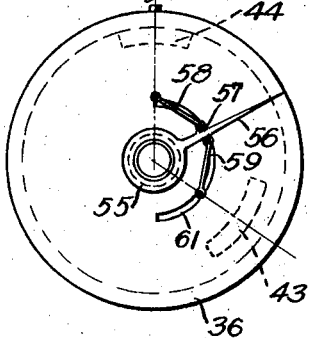
Fig. 3 is an end elevational view of a counterbalancing device.

Referring to Fig. 5, the weights 43 and 44, as indicated, are so determined that the centrifugal forces created are equal. Their resultant is, therefore, always in the bisecting line 65 between the radii to the centers of gravity of the weights. The magnitude of this resultant is a function of the angle $\phi$ and is designated by the indicator 56.

The operation of my device is briefly as follows: assuming a correction for the unbalance of the rotor 26 to be made in the planes A—A and B—B, which are the most accessible parts for the addition of correction weights, the fulcrum 4 is moved in either one of these planes, say plane A—A. The motor 29 is energized to actuate the rotor 26, which causes a vibration of the movable bed 2 on account of the centrifugal forces set up by the unbalance mass. The counterbalancing mechanism is then so manipulated that the weights 43 and 44 set up a counter-centrifugal force to neutralize that produced by the unbalanced mass in the rotor. These forces are opposed and are equal when the indicator 20 indicates that the vibration of the bed 2 is zero.

The reading of the indicator 64 then indicates the magnitude of unbalance of the weights 43 and 44, which is proportional to the amount of correction to be made in the rotor, and the indicator 56 indicates the longitudinal plane in which the correction is to be applied on the surface B—B. The bed 2 is then raised from the fulcrum 4 by means of the lifting jacks 15, and the fulcrum 4 is moved in the plane B—B, where the operation is duplicated and the correction applied to the plane A—A.

The corrections need not be applied, but the amount and location simply indicated on the rotor to speed up the operation, and the corrections may be made after the rotor has been removed from the machine.

It will be readily understood, from the above description of my invention that a device formed in accordance therewith provides an efficient means for testing rotors, such as armatures and other high-speed bodies for unbalance, and an important advantage of this device is that no application of weights is necessary in order to obtain the condition of balance. This device is especially adapted for the testing of rotors in large quantities, as it permits of making such tests in relatively short periods of time.

Although I have described a specific embodiment of my invention, it will be obvious to those skilled in the art that various modifications may be made in the details of construction. For instance, the stationary support, the movable bed, the yielding spring mounting, and the lifting jacks may be of any suitable construction to meet the requirements of sizes and types of rotors to be tested, and the counterbalance mechanism may be of any suitable design to effect a counterbalancing of forces produced by the unbalance mass in the rotating body. The manipulating devices employed in this machine may be of any suitable type to produce the proper functioning of adjustments. These and other changes may be made without departing from the principles herein set forth.

I claim as my invention:

1. A balancing machine comprising a stationary support, a bed yieldingly supported thereon, a movable fulcrum interposed between said bed and said support, means on said bed for rotatably mounting a body to be tested, means for rotating said body, means for counteracting the moment of the centrifugal force exerted upon said bed by the unbalance of the rotating body about a given transverse axis and means for adjusting the counter-acting means while the body is rotating.

2. A balancing machine comprising a stationary support, a bed yieldingly supported thereon, a movable fulcrum interposed between said bed and said support, means for moving said fulcrum longitudinally of said bed, means on said bed for rotatably mounting a body to be tested, means for rotating said body, means for counteracting the centrifugal force exerted upon said bed by the unbalance of the rotating body and means for adjusting the counter-acting means while the body is rotating.

3. A balancing machine comprising a stationary support, a movable bed for rotatably supporting a body to be tested, a movable fulcrum between said bed and said support, indicating means rotatably mounted on the bed for determining the magnitude of the unbalance in the body being tested, said indicating means consisting of a plurality of movable weights relatively adjustable having graduated disks in co-operative alinement to indicate the amplitude of their relative positions, means for adjusting the weights while the body is rotating, and means for determining the relative location of the unbalance.

4. A balancing machine comprising a stationary support, a bed yieldingly mounted thereon which is adapted to rotatably support a body to be tested, a movable fulcrum between said bed and said support, indicating means for determining the magnitude of the unbalance in the body being tested, said indicating means consisting of a plurality of movable weights that are relatively adjustable and rotatably mounted on the bed having graduated disks in co-operative alinement to indicate the relative positions of said weights, and said locating means consisting of an indicator automatically adjustable with said movable weights which indicates the longitudinal plane in which the unbalance exists.

5. A balancing machine comprising a stationary support, a bed secured by a plurality of springs to said support, a movable fulcrum between said bed and said support, means for lifting said bed out of contact with said fulcrum, means for rotatably mounting a body to be tested on said bed, and means rotatably mounted on the bed for determining the amount and location of unbalance in the rotating body.

6. A balancing machine comprising a stationary support, a bed secured by a plurality of springs to said support, a movable fulcrum between said bed and said support, means for lifting said bed out of contact with said fulcrum, means for rotatably mounting a body to be tested on said bed, and means rotatably mounted on the bed for determining the amount and location of unbalance in the rotating body, about a given transverse axis thereof.

7. A balancing machine comprising a stationary support, a bed secured by a plurality of transverse springs to said support, a fulcrum movably secured between said bed and said support, a screw-and-nut mechanism for actuating said fulcrum, a screw-and-nut mechanism geared to a plurality of vertical jacks for lifting said bed out of contact with said fulcrum, means on said bed for rotatably mounting a body to be tested, and indicating means for determining the amount and location of unbalance in the rotating body about a given transverse axis thereof.

8. A balancing machine comprising a stationary support, a bed secured by a plurality of transverse springs to said support, a fulcrum movably secured between said bed and said support, a screw-and-nut mechanism for actuating said fulcrum, a screw-and-nut mechanism geared to a plurality of vertical jacks for lifting said bed out of contact with said fulcrum, means on said bed for rotatably mounting a body to be tested, and indicating means for determining the amount and location of unbalance in the rotating body about a given transverse axis thereof, and adjusting means for counteracting the centrifugal forces produced on the movable bed by the unbalance of the rotating body.

9. In a balancing machine for testing rotors, the combination with an oscillatory bed, of a movable fulcrum member for supporting the bed, a balancing head mounted on the bed, said balancing head comprising two rotatably mounted balancing weights each disposed to be moved angularly with respect to a rotor being balanced and means for adjusting the weights while the rotor and the weights are rotating.

10. In a balancing machine for testing rotors, the combination with an oscillatory bed, of a balancing head mounted on the bed, said balancing head comprising two rotatably mounted balancing weights, each disposed to be moved angularly along paths of different radii with respect to a rotor being balanced while the rotor is rotating, and means for indicating the resultant unbalanced moment of the balancing weights and the angular position thereof.

11. In a counterbalancing device for balancing machines, a plurality of rotatably mounted balancing weights disposed to be adjusted angularly in the same transverse plane and along paths of different radii while they are rotating.

12. A balancing machine comprising a base, an oscillatable bed mounted on the base, means on the bed for rotatably supporting a rotor to be balanced, a longitudinally movable fulcrum member interposed between the bed and the base in a transverse plane of the rotor, a plurality of balancing weights rotatably mounted on the bed and disposed to rotate in a plane parallel to the fulcrum plane and means for adjusting the weights angularly while the rotor is rotating to neutralize the moment of the unbalanced mass in the rotor with respect to the fulcrum axis.

13. A balancing machine comprising a base, an oscillatable bed mounted on the base, means on the bed for rotatably supporting a rotor to be balanced, a fulcrum member interposed between the bed and the base, a plurality of balancing weights rotatably mounted on the bed and disposed to rotate in synchronism with the rotor to be tested and means for adjusting the weights angularly while the rotor is rotating to neutralize the turning moment about the fulcrum axis that is exerted by the unbalanced mass in the rotor.

14. In a machine for balancing rotors, the combination with a stationary support, a bed yieldingly mounted on the support and means on the bed for rotatably mounting a rotor to be tested, of a fulcrum member interposed between the bed and the support and disposed to be moved longitudinally relative to the bed to limit the movement of the bed to angular oscillation about an axis in a transverse plane of the rotor being tested, means for counteracting the moment about the fulcrum axis of the unbalanced centrifugal force exerted upon the bed by the body and means for adjusting the counteracting means while the body is rotating.

In testimony whereof, I have hereunto subscribed my name this 13th day of December, 1922.

CARL RICHARD SODERBERG.